US009551779B2

(12) United States Patent
Glazer

(10) Patent No.: US 9,551,779 B2
(45) Date of Patent: Jan. 24, 2017

(54) CONTROLLING MOVEMENTS OF POINTING DEVICES ACCORDING TO MOVEMENTS OF OBJECTS

(71) Applicant: Yariv Glazer, Ann Arbor, MI (US)

(72) Inventor: Yariv Glazer, Ann Arbor, MI (US)

( * ) Notice: Subject to any disclaimer, the term of this patent is extended or adjusted under 35 U.S.C. 154(b) by 684 days.

(21) Appl. No.: 13/734,913

(22) Filed: Jan. 4, 2013

(65) Prior Publication Data

US 2014/0192204 A1  Jul. 10, 2014

(51) Int. Cl.
*G01S 3/786* (2006.01)
*H04N 5/232* (2006.01)

(52) U.S. Cl.
CPC ......... *G01S 3/7864* (2013.01); *H04N 5/23296* (2013.01); *A63B 2220/806* (2013.01); *H04N 5/232* (2013.01)

(58) Field of Classification Search
CPC ............ A63B 2220/10; A63B 2220/13; A63B 2220/14; A63B 2220/804; A63B 2220/83; A63B 2220/833; A63B 2220/836; G01S 3/7864
USPC .......................... 348/157, 169, 170, 171, 172
See application file for complete search history.

(56) References Cited

U.S. PATENT DOCUMENTS

| 4,067,015 | A | * | 1/1978 | Mogavero et al. .......... 340/13.1 |
| 5,513,854 | A | * | 5/1996 | Daver ............................. 700/91 |
| 5,912,700 | A | * | 6/1999 | Honey et al. ................. 348/157 |
| 6,204,813 | B1 | * | 3/2001 | Wadell et al. ................ 342/463 |
| 7,492,262 | B2 | * | 2/2009 | Washington ............... 340/572.1 |
| 8,786,415 | B2 | * | 7/2014 | Cavallaro .......... A63B 24/0021 340/323 R |
| 8,884,741 | B2 | * | 11/2014 | Cavallaro .......... A63B 24/0021 340/573.1 |
| 2008/0088703 | A1 | * | 4/2008 | Dollahite ...................... 348/169 |
| 2008/0129825 | A1 | * | 6/2008 | DeAngelis et al. .......... 348/169 |
| 2008/0225137 | A1 | * | 9/2008 | Kubo et al. ................. 348/231.2 |
| 2008/0303901 | A1 | * | 12/2008 | Variyath et al. .............. 348/143 |
| 2009/0144785 | A1 | * | 6/2009 | Walker et al. ................ 725/105 |
| 2010/0026809 | A1 | * | 2/2010 | Curry ............................ 348/157 |
| 2010/0245588 | A1 | * | 9/2010 | Waehner et al. ............. 348/169 |
| 2011/0032361 | A1 | * | 2/2011 | Tamir et al. .................. 348/157 |
| 2011/0135149 | A1 | * | 6/2011 | Gefen ........................... 382/103 |
| 2011/0205077 | A1 | * | 8/2011 | Cavallaro et al. ......... 340/686.6 |

(Continued)

FOREIGN PATENT DOCUMENTS

JP      2006115525 A  *  4/2006
JP      2007243520 A  *  9/2007

*Primary Examiner* — John Villecco

(57) ABSTRACT

A method and apparatus for controlling pointing devices such as cameras according to the movements of an objects, such as balls or selected players of interest by attaching to the object, an RFID which, when triggered, transmits the identification of the object and detecting the transmitted identification at of different locations to define the instantaneous space location of the object. The detected identifications are inputted into an RTLP (Real-Time Location Processor) to produce tracking signals which cause the pointing device to track the movements of the object in a real-time manner. Another signal, is also derived from the RTLP defining another instantaneous condition of the object, and is also fed to the pointing device to control another parameter, such as the magnification or the displayed field-of-view, of the pointing device in a real-time manner.

28 Claims, 3 Drawing Sheets

(56) References Cited

U.S. PATENT DOCUMENTS

| | | | |
|---|---|---|---|
| 2012/0300079 A1* | 11/2012 | Hale | 348/157 |
| 2013/0300832 A1* | 11/2013 | Hohteri et al. | 348/46 |
| 2015/0235076 A1* | 8/2015 | Aimonen | G06K 9/00342 348/157 |
| 2015/0247912 A1* | 9/2015 | Tang | G01S 3/7864 348/169 |

* cited by examiner

CONTROLLING MOVEMENTS OF POINTING DEVICES ACCORDING TO MOVEMENTS OF OBJECTS

RELATED APPLICATION

This application claims priority from U.S. Provisional Application Ser. No. 61/583,592, filed Jan. 5, 2012, and incorporates by reference the disclosure therein.

FIELD AND BACKGROUND OF THE INVENTION

The present invention relates to a method and apparatus for controlling movements of a pointing device according to movements of an object. The invention is particularly useful in televising and recording sport events, where cameras are used for tracking the movements of a ball or puck, and/or of key players. The invention is therefore described below especially with respect to such an application, but it will be appreciated that the invention is also useful in many other applications, as will be also described below.

In televising sport events of high profile, a large number of cameras are used for capturing images of the ball, puck, or selected player included in each play from number of different views, which images are selected for playback to better show different aspects of the plays. This involves high costs since it requires a large number of operators to control the many cameras and the selected playbacks. Such methods are therefore generally restricted to televising sport events of high profile, such as professional or college games, and are generally not used in lower profile sports such as high school games. Another drawback is that showing the different aspects of each play in the form of playbacks interrupts the continuity of viewing of a game by the viewers. Similar drawbacks are involved in controlling pointing devices, other than cameras, according to the movements of the objects other than balls, bucks or the players.

OBJECT AND BRIEF SUMMARY OF THE INVENTION

An object of the invention is to provide a method and apparatus for controlling pointing devices generally, and cameras specifically, having advantages in one or more of the above respects. Another object of the invention is reduce the need of playback when televising sport events, and a still further object of the invention is to better capture and/or show different aspects of the same event for instant viewing or for later playback.

While the invention is particular useful in televising sport events, as described above, it is also useful in many other applications, as will also be briefly describe below.

According to one broad aspect, the invention provides a method of controlling a pointing device according to the movements of an object of interest in a monitored field, comprising: attaching to the object, an RFID (Radio Frequency identification Device) which, when triggered, transmits the identification of the object; detecting the transmitted identification at a plurality of different locations sufficient to define the instantaneous space location of the object in the monitored field; inputting the detected identifications into an RTLP (Real-Time Location Processor); deriving from the RTLP a tracking signal defining the real-time movements of the object within the monitored field; and feeding the tracking signal to the pointing device to cause it to track the movements of the object in a real-time manner; characterized in that another signal, in addition to the tracking signal, is also derived from the RTLP defining another instantaneous condition of the object, and is also fed to the pointing device to control another parameter of the pointing device in a real-time manner.

As indicated above, the invention is particular useful, and is therefore described below, for televising sport events wherein the monitored field is a sport field, and the pointing device is a camera displaying the real-time movements of the object of interest during the playing of a game. In some described embodiments, the object of interest is or includes a ball or puck involved in playing the game, and in other embodiments, the object of interest is or include a person or a player in the game.

According to further features in some described embodiments, the other real-time condition of the object (ball, puck or player) is its distance from a specified reference point or line. The another parameter of the pointing device may be the field-of-view of a camera, which is decreased to thereby increase to magnification of the ball or puck displayed, when the ball or puck is within a specified distance from a specified reference point or line, or when the horizontal velocity of the ball or puck is relatively low, or when the vertical acceleration of the ball or puck is relatively high (e.g., to indicate dribbling in basketball).

According to other embodiments, the other parameter of the pointing device controlled may be the highlighting of the display of the object by a camera, or the actuation of a spot-light to illuminate the specified performer.

According to another aspect, the invention provides apparatus for controlling a pointing device according to the movements of an object of interest in a monitored field, comprising: an RFID (Radio Frequency identification Device) which is attached to the object, and which when triggered, transmits the identification of the object; detectors for detecting the transmitted identification at a plurality of different locations sufficient to define the instantaneous space location of the object in the monitored field; an RTLP (Real-Time Location Processor) coupled to the Derivative Processor for deriving therefrom a tracking signal defining the real-time movements of the object within the monitored field; and a pointing device controlled by the RTLP to track the movements of the object in a real-time manner; characterized in that the RTLP derives another signal, in addition to the tracking signal, defining another instantaneous condition of the object, which another signal is also fed to the pointing device to control another parameter of the pointing device in a real-time manner.

As will be further described below, such method and apparatus provides a number of important advantages over existing technics for televising sport events, for various types of performances, such as stage, plays, concerts, circus acts, and the likes, and for controlling directable and focusable microphones and speakers.

Further features and advantages of the invention will be apparent form the description below.

BRIEF DESCRIPTION OF THE DRAWINGS

The invention is herein described, by way of example only, with reference to the accompanied drawings, wherein.

It is to be understood that the forgoing drawings, and the description below, are provided primarily for purposes of facilitating understanding the conceptual aspects of the invention and possible embodiments thereof, including what is considered to be a preferred embodiment. In the interest of clarity and brevity, no attempt is made to provide more details then necessary to enable one skilled in the art, using routine skill and design, to understand and practice the described invention. It is to be further understood that the embodiments described are for a purposes of example only, and that the invention is capable of been embodied in other forms and applications than described herein.

DESCRIPTION OF PREFERRED EMBODIMENTS OF THE INVENTION

As indicated earlier, the invention involves controlling a pointing device according to the movements of an object of interest in a monitored field, wherein an RFID (Radio Frequency identification Device) is attached to the object, which RFID, when triggered, transmits the identification of the object. The transmitted identification is detected at a plurality of different locations sufficient to define the instantaneous space location of the object in a monitored field; and the detected identification is inputted into an RTLP (Real-Time Location Processor). In known systems, a tracking signal is derived from the RTLP defining the real-time movement of the object within the monitored field; and the tracking signal is fed to the pointing device to cause it to track the movements of the object in a real time manner. Such a tracking method or apparatus is broadly referred to below as "of the type specified herein".

According to the present invention, another signal, in addition to the tracking signal, is also derived from the RTLP defining another instantaneous condition of the object, and is also fed to the pointing device to control another parameter of the pointing device in a real-time manner. Such a novel tracking system may be implemented in many different applications as will be described in the examples set forth below, to provide a number of important advantages as will also be describe below.

The RFID may be an active device, in which the power supply is in the RFID tag itself. However, in most of the applications described below, the RFID is a passive device, wherein it receives the energy from the detectors, usually transceivers, detecting the transmitted identification, to thereby minimize the size and weight of the RFID tag attached to the object.

Figure 1:
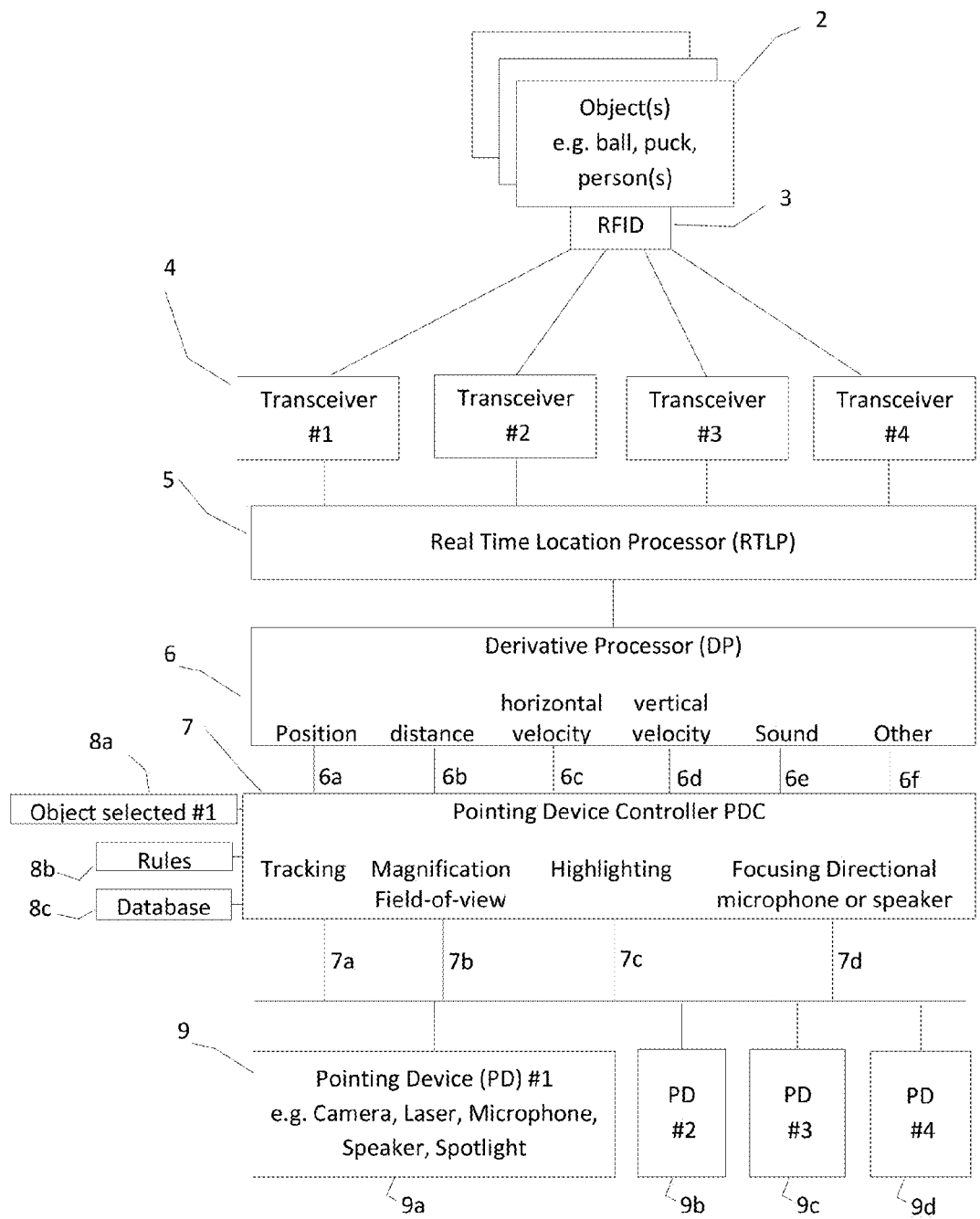
FIG. 1 is a block diagram of an overall system constructed in accordance with the present invention.

Thus, as shown in FIG. 1, the system includes one or more objects 2 each carrying an RFID tag 3 which, when triggered, transmits the identification of the respective object. Also illustrated in FIG. 1 is a plurality of transceivers 4, for detecting the transmitted identification at a plurality of different locations sufficient to define the instantaneous space location of the object in a monitored field. The identification of each transceiver 4 is inputted into a Real-Time Location Processor (RTLP) 5 coupled to a Derivative Processor (DP) 6 which outputs, among other signals, an instantaneous position signal 6a defining the instantaneous position of the object identified by its respective RFID tag. Output 6a from the derivative processor 6 is inputted into a pointing device controller (PDC) 7. The later controller has a, number of other inputs, including an Object-Select input 8a, a Rules input 8b, and a Database input 8c. It produces a tracking signal output 7a to the pointing devices 9a-9c, generally designated 9, to cause each pointing device to track the instantaneous movements of the respective object 2.

According to the present invention, the derivative processor 6 includes, besides the instantaneous position output 6a, a number of other outputs representing one or more other instantaneous conditions of the object been tracked. In the specific embodiments described below, these other instantaneous conditions include: the distance of the respective object from a specified reference point or line, as shown by output 6b; the horizontal velocity of the respective object as shown by output 6c; the vertical acceleration of the respective object, as shown by output 6d; and the sound level emitted by the object, as shown by output 6e. Still other instantaneous conditions of the respective object may be tracked as shown by output 6f.

According to the present invention, the pointing device controller 7 also includes a number of outputs, in addition to the tracking output 7a, to control a number of other parameters of the respective pointing devices 9a-9d.

Examples of the invention are described below wherein the pointing device is or includes a camera, a laser, a spotlight, a directional microphone, and/or a directional speaker. In these examples, the pointing device controller 7 includes, in addition to the tracking output 7a, a magnification or field-of-view output 7b, a highlighting output 7c, and a focusing output 7d. Thus, the magnification or field-of-view output 7b may be used with a camera pointing device for controlling the size of the object displayed in the camera, and thereby also the field-of-view, it being appreciated that an increase in the size decreases the field-of-view. The highlighting output 7c may be used for highlighting the object display in a camera, such as by encircling it or intensifying its display. The focusing output 7d may be used with respect to a directional microphone for focusing the point of reception of the sound received by the microphone, or with respect to directional speakers for focusing the point of transmission of the audio sounds emitted by the speakers.

As noted above, the pointing device controller 7 includes, besides inputs 6a-6f from the derivative processor 6, also inputs 8a-8c, in order to produce the outputs 7a-7d to the pointing devices 9a-9d. Thus, input 8a may be a manual Object-Selected input for selecting a particular object to be tracked with a selected pointing device 9a-9d, to control another of its parameters according to another instantaneous condition of the respective object. Input 8b may be a predefine Set of Rules which prescribe which pointing device is to be used with respect to each object, and which other parameters of the respective pointing device is to be changed according to the instantaneous condition of the respective object. Input 8c is a Database for setting forth certain pre-defined data, such as the horizontal velocity, the distance between the object and a specified reference, etc., to effect a change in a parameter in the respective pointing device.

Figure 2:
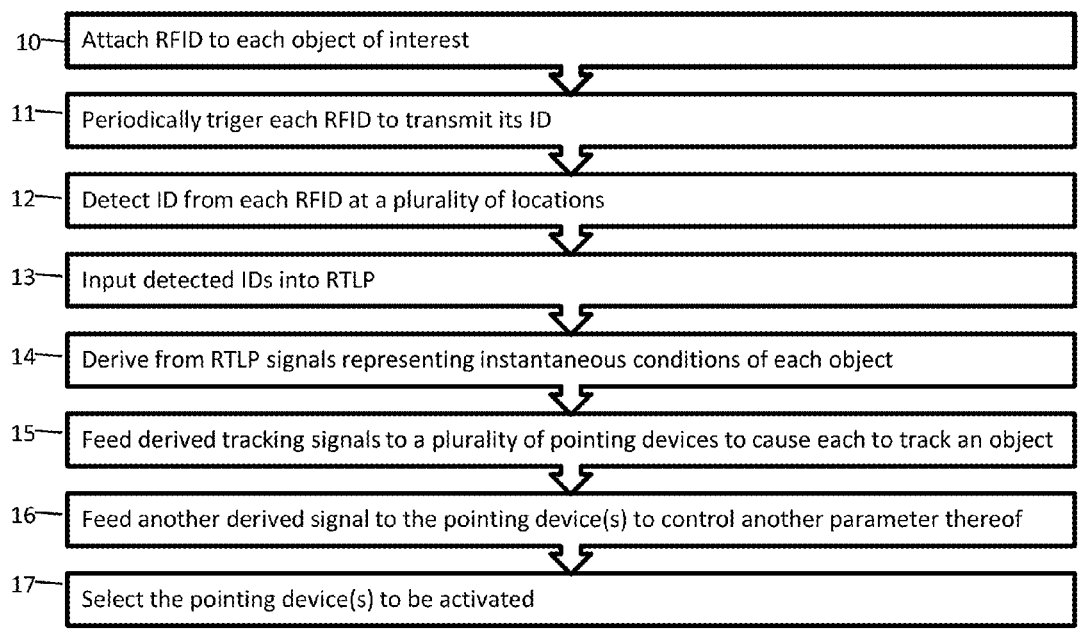
FIG. 2 is flow chart illustrating the overall operation of the system of FIG. 1.

Turning now to the flowchart illustrated in FIG. 2, an RFID, (3 in FIG. 1), is attached to each object 2 of interest (operation 10). Each RFID is periodically triggered, e.g. 10 times per second, to transmit its identification (operation 11). The identification of each RFID 3 is detected by transceivers 4 at a plurality of locations (e.g., 3-10), sufficient to identify the instantaneous space position of the respective object (operation 12). As shown by operation 13, the detected identifications are inputted into an RTLP (5, FIG. 1) and are processed by a derivative processor (6, FIG. 1) to derive various signals representing various instantaneous conditions of each object as indicated by outputs 6a-6f in FIG. 1

(operation 14). These outputs are than fed to a plurality of pointing devices 9 to control each, as indicated by operations 15 and 16 in FIG. 2. As described above with respect to FIG. 1, the various operations of the pointing device thus controlled include causing the pointing device to track its respective object (output 7a), and controlling one or more other parameters of the respective pointing device, as indicated by outputs 7b-7d in FIG. 1 and as to be describe more particularly below.

The examples illustrated in FIGS. 1 and 2 include a plurality of objects and a plurality of pointing devices, and therefore FIG. 2 includes operation 17 for selecting each pointing device to be activated with respect to each object of interest. As indicated above with respect to FIG. 1, the selections of each object, as well as the Rules by which the objects are selected and the respective pointing devices controlled, are inputted via inputs 8a and 8b into the pointing device controller 7 of FIG. 1.

SOME EXAMPLES OF IMPLEMENTING THE INVENTION

Example 1

Figure 3:
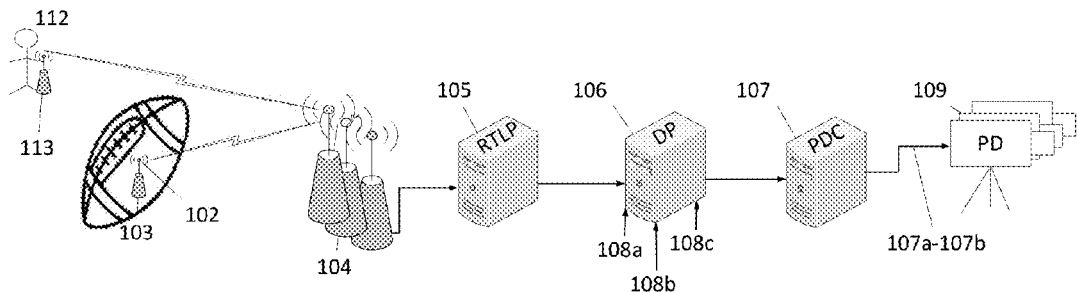
FIG. 3 is a schematic diagram of a football-televising embodiment of the invention.

FIG. 3 illustrates the invention implemented in a sport game, wherein the monitored field is a stadium or arena; the object of interest is a ball 102 having an attached RFID tag 103 identifying the respective object; and the plurality of detecting devices are transceivers 104 which detect the transmitted identifications at a plurality of different locations sufficient to define the instantaneous space location of the respective object in the monitored field. The outputs of the transceivers 104 are fed to the RTLP 105 which includes a derivative processor 106. The instantaneous position and one or more other instantaneous conditions of each object are derived by processor 106. Its outputs 106a-106f are fed to the pointing devices controller 107 to cause the respective pointing device to track the instantaneous movements of the respective object, as well as to control one or more other parameters of the pointing devices 109 as described above with respect to FIGS. 1 and 2, and as will be described more particularly below.

The example illustrated in FIG. 3 is one wherein the object of interest 103 is a football, and the pointing devices 109 are cameras which are selectively controlled according to the instantaneous condition of the object. Thus, tracking signal output 106a controls the cameras so that they continuously point to, and thereby track, the movement of, the ball 102.

In this example, derivative processor 106 also includes an output 6b which represents a specified distance of the ball from a specified line or point. The line or point as specified for example in the Rules input 8b, may be the goal line, scrimmage line, or 25 yard line representing the red-zone in a football field; and the additional parameter of the pointing device (camera) controlled in response to the instantaneous position of the ball at a specified distance from the reference line may be effective to increase the magnification of the ball displayed by the camera, and thereby to decrease the field of display. This automatic change in the display of the respective object in the respective camera can be immediately shown to the viewer, or can be stored for playback at a later time. In either case, this change in the display is effective automatically upon the occurrence of the specified instantaneous condition of the object, and does not requires that an operator be provided for making this change in the display. This feature thereby substantially reduces the total number of operators required in such a tracking system, as well as enhances the information viewed to the viewer for each event.

It will be appreciated that the monitored field of FIG. 3 could also be a soccer field wherein ball 102 is a soccer ball, or a hockey field wherein it is a hockey puck. In addition, the reference line, could be, instead of a scrimmage line, a red-zone line (e.g. the 25 yard line in a football field), wherein the precise movement of the ball is of particular interest. Still further, the monitored field could be a tennis court, wherein the ball 102 is a tennis ball, and the reference line is a boundary line.

It will be further appreciated that the object tracked could be one or more selected players, as schematically shown at 112, carrying an RFID 113, e.g. attached to the player's shirt, in lieu of, or together with, the ball 102 and its RFID 103.

Example 2

Figure 4:
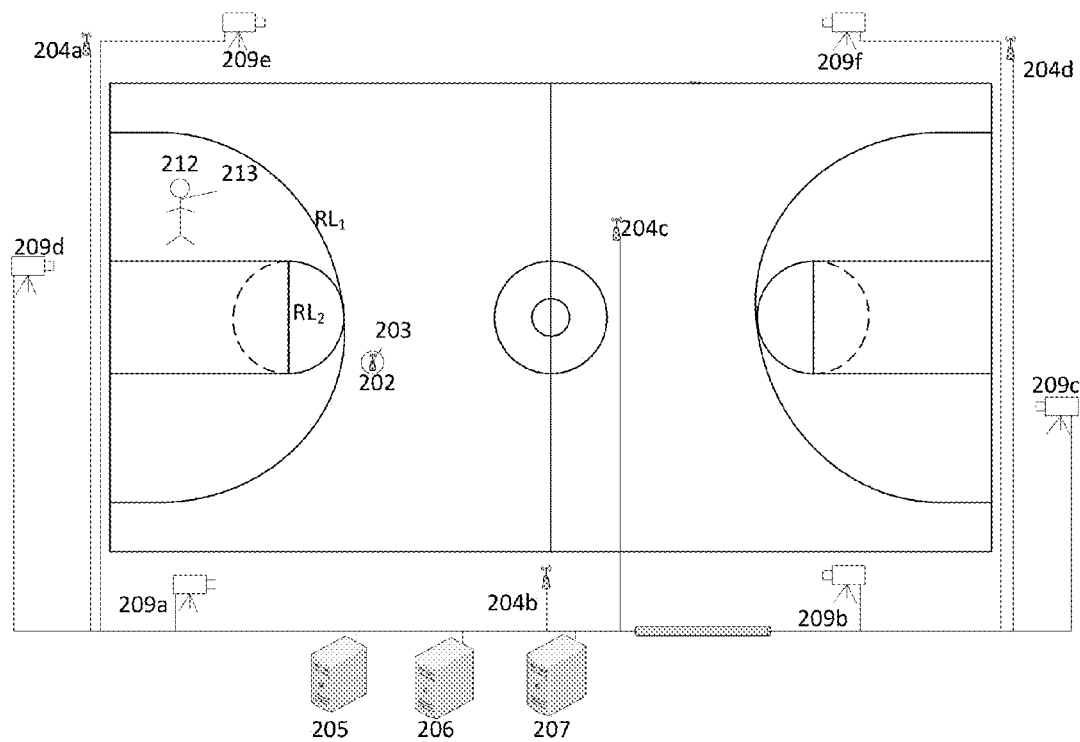
FIG. 4 is a schematic diagram of a basketball-televising embodiment of the invention.

FIG. 4 illustrates another example of the invention wherein the monitored field is a basketball court. In the illustrated example, the objects of interest include a basketball 202, and one or more leading players 212, each carry an RFID tag, schematically shown as 203 and 213, respectively. The detectors are antennas or other transceivers, schematically shown as 204a-204d, located at different locations on the basketball court. The pointing devices are cameras, schematically shown as 209a-209f. The outputs of the detectors are fed to an RTLP 205, and are processed in a derivative processor 206, which controls the operations of the pointing devices 209a-209f via pointing device controller 207, in the manner described above and to be further described below.

In this example, the controls of the cameras of the cameras 209a-209f are effective in response to the instantaneous position of the ball 202a, and/or of the specified players 212, with respect to a specified reference line on the basketball court. In this example, the reference line may be the 3-point shooting line $RL_1$, and/or the penalty shooting line $RL_2$.

Thus, the example illustrated in FIG. 4 operates in the same manner as described above, in that the detectors 204a-204f detect the instantaneous position of either the ball 202 or the player 212, from the identifications periodically transmitted by RFIDs 203 and 213 attached to each of the objects being tracked. These signals are fed to the RTLP 205 which, via its derivative processor 206, produces a tracking output signal 107a to the camera controller 207 causing it to track the movement of the respective objects (ball and/or player). Processor 206 also outputs one or more other signals 107b-107f, each controlling another parameter of the pointing device (camera) for the respective object according to its instantaneous position. In the example illustrated in FIG. 4, the other parameter is or includes the distance of the ball or player from the three-point reference line $RL_1$, or from the free-throw line $RL_2$; and the parameter of the camera controlled in response to this other instantaneous condition of the ball or player may be the magnification of the display of the respective object experiencing the detected condition. Thus when the condition is detected, the magnification of the object displayed by the camera is increased, thereby also reducing the camera field-of-view. Alternatively or in addition, when the specified condition of the object is detected, (e.g., its being within a specified distance from a reference line), the respective object may be highlighted by been encircled or spot-lighted.

Further Examples

In Example 1 and 2 described above, the derivative processor (6,106) is programmed to detect the instantaneous condition of the object been tracked, and outputs its position via output (6*a*, 106*a*) to the pointing device (e.g. cameras 9,109) controlled to cause it to track the movement of the object; it can also be programmed to detect the respective distance of the object from a reference line to produce another output (6*b*, 106*b*) to the pointing device control the magnification/field-of-view, and/or highlighting, of the displayed object in the respective camera, as described above. The derivative processor (6, 106) could also be programmed to detect other instantaneous conditions of the respective object to provide other outputs, such as shown at 6*a*-6*f* and 106*a*-106*f*, to control one or more other parameters of the camera pointing device in a real-time manner.

As one example, the derivative processor (6, 106) could also detect the horizontal velocity of a ball or puck, when televising a game of football, soccer, hockey, baseball or basketball, to increase the magnification of the ball or puck, and thereby to reduce the field-of-view, when the horizontal velocity of the ball or puck is relatively low, and to decrease the magnification, and thereby to increase the field-of-view, when the horizontal velocity of the ball or puck is relatively high.

Another example would be to detect the vertical acceleration of the ball, and to produce a signal corresponding to output (6*d*, 106*d*) effective to increase the magnification of the object display, or to highlight the object display, when the vertical acceleration is relatively high, to thereby enable better viewing of the ball during dribbling in a game of basketball.

As another example the invention could be implemented in a system wherein the pointing device or devices (9*a*-9*d*, 109*a*-109*d*) are not cameras but rather are lasers which track the movement of the respective objects of interest in accordance with their instantaneous positions or other conditions as described above with respect to FIG. 1. The control of the laser beams could be, not only to cause them to track the movement of the respective objects, but also to be turned-on or turned-off or to actuate another device according to another instantaneous conditions of the respective object.

The invention could also be embodied in apparatus wherein the pointing device or devices are spot-lights which are selectively controlled according to the instantaneous position or other condition of the respective object. Spot-light pointing devices can be used in various types of performances (plays, concerts, circus act, etc.) to highlight selected performers at selected times.

For example, the spot-lights could be mounted at different locations to cover the monitored field, with each spot-light been pivotal in both the vertical and the horizontal planes in response to the instantaneous position of the selected performer (object), and actuated to spotlight the respective performer when another instantaneous condition is detected, such as talking (in a play), solo singing or playing an instrument (in a concert), moving above a particular velocity (in a circus act), etc.

The invention could also be used with respect to still other types of pointing devices. For example, directional microphones and directional speakers are known which can be moved in all three planes to change the pointing direction of the pointing device, and also to focus at a particular point in the pointing direction in order to define a specific point of receiving a sound (sonic or supersonic) in the case of a microphone, or of transmitting the sound in the case of a speaker. For example, see the directional speakers described in U.S. Pat. Nos. 4,823,908 and 7,298,853, the contents of which are incorporated herein by reference.

As one example, such a directional and focusable microphone can be used to track the movement of a selected person of interest and to be focused to a specific point in response to the tracked person talking, singing, or performing, in order to better hear or record the sounds from that person during such performance. As another example, a directional and focusable speaker could be used to track the movement of the selected person of interest, identified by an RFID, and to transmit a sound messages focused at the specific location of the person in the pointing direction in response to the position, certain movements, certain sound produced by, or another instantaneous condition of, the respective person.

As a further example, the objects of interest are persons; the RFID is a mobile phone carried by each person; and the pointing devices could be directional and focusable speakers which track the movements of the persons and focus a speaker to a selected location when a person is at the respective location to thereby transmitted selected messages capable of being heard only by persons at such selected locations.

It will thus be seen that, while the invention has been described with respect to a number of examples, these are set forth merely for purposes of illustration, and that many other variations, modifications, and applications of the invention could be made.

The invention claimed is:

1. A method of controlling a pointing device according to the movements of an object of interest in a monitored field, comprising:
   attaching to the object, which is or includes a ball or puck involved in playing a game, a Radio Frequency Identification Device which, when triggered, transmits the identification of the object;
   detecting the transmitted identification at a plurality of different locations sufficient to define the instantaneous space location of the object in the monitored field;
   inputting the detected identifications into a Real-Time Location Processor;
   deriving from the Real-Time Location Processor a tracking signal defining the real-time movements of the object within the monitored field;
   and feeding the tracking signal to the pointing device to cause it to track the movements of said object in a real-time manner;
   characterized in that another signal, in addition to said tracking signal, is also derived from said Real-Time Location Processor defining another instantaneous condition of the object, and is also fed to the pointing device to control another parameter of the pointing device in a real-time manner;
   wherein said another instantaneous condition of the ball or puck is its vertical acceleration.

2. The method according to claim 1, wherein said pointing device is a spot-light, and said another parameter of the pointing device is the actuation of the spot-light to illuminate the respective object.

3. The method according to claim 1, wherein said object of interest includes a specified person, said pointing device is a directional microphone or other audio receiver having a variable focal point, and said another parameter of the pointing device is the focal point of the audio receiver.

4. The method according to claim 1, wherein said object of interest includes a specified person within a specified region, said pointing device is a directional speaker or other audio transmitter having a variable focal point, and said other parameter of the pointing device is the focal point of the audio transmitter.

5. The method according to claim 1, wherein there are a plurality of pointing devices selectively controlled by said another signal from a derivative processor.

6. The method according to claim 1, wherein there are a plurality of objects of interest and a plurality of pointing devices, each being controlled to track the movements and said another parameter of a selected object of interest according to instantaneous conditions of the respective object.

7. A method of controlling a pointing device according to the movements of an object of interest in a monitored field, comprising:
   attaching to the object, which is or includes a ball or puck involved in playing a game, a Radio Frequency Identification Device which, when triggered, transmits the identification of the object;
   detecting the transmitted identification at a plurality of different locations sufficient to define the instantaneous space location of the object in the monitored field;
   inputting the detected identifications into a Real-Time Location Processor;
   deriving from the Real-Time Location Processor a tracking signal defining the real-time movements of the object within the monitored field;
   and feeding the tracking signal to the pointing device to cause it to track the movements of said object in a real-time manner;
   characterized in that another signal, in addition to said tracking signal, is also derived from said Real-Time Location Processor defining another instantaneous condition of the object, and is also fed to the pointing device to control another parameter of the pointing device in a real-time manner; and
   wherein said another instantaneous condition of the ball or puck is its vertical acceleration, and said another parameter of the pointing device is the field-of-view of a camera which is decreased, and thereby the magnification of the ball or puck displayed is increased, when the vertical acceleration of the ball or puck is relatively high.

8. The method according to claim 7, including one or more of said pointing devices which are or include a camera, laser, spotlight, directional microphone and/or directional speaker.

9. The method according to claim 7, wherein said object of interest includes one or more persons involved in playing a game.

10. The method according to claim 7, wherein said another instantaneous condition of the ball or puck includes its distance from a specified reference point or line.

11. The method according to claim 10, wherein said other parameter of the pointing device is the field-of-view of a camera, which is decreased to thereby increase the magnification of the ball or puck displayed, when the ball or puck is within a specified distance from a specified reference point or line.

12. The method according to claim 10, wherein said other another parameter of the pointing device includes highlighting of its display by a camera when the ball or puck is within a specified distance from the specified reference point or line.

13. The method according to claim 7, wherein said another instantaneous condition of the ball or puck includes its horizontal velocity, and said another parameter of the pointing device is the field-of-view of a camera which is decreased, and thereby the magnification of the ball or puck displayed is increased, when the horizontal velocity of the ball or puck is relatively low.

14. The method according to claim 7, wherein said object of interest includes a specified person in the monitored field, and said another parameter of the pointing device includes highlighting of the display of that person by a camera when within a specified distance from a reference point or line.

15. Apparatus for controlling a pointing device according to the movements of an object of interest in a monitored field, comprising:
   a Radio Frequency Identification Device which is attached to the object, which is or includes a ball or puck involved in playing a game, and which when triggered, transmits the identification of the object;
   detectors for detecting the transmitted identification at a plurality of different locations sufficient to define the instantaneous space location of the object in the monitored field;
   a Real-Time Location Processor coupled to a Derivative Processor for deriving therefrom a tracking signal defining the real-time movements of the object within the monitored field;
   and a pointing device controlled by said Real-Time Location Processor to track the movements of said object in a real-time manner;
   characterized in that said Real-Time Location Processor derives another signal, in addition to said tracking signal, defining another instantaneous condition of the object, which another signal is also fed to the pointing device to control another parameter of the pointing device in a real-time manner;
   wherein said another instantaneous condition of the ball or puck is its vertical acceleration.

16. The apparatus according to claim 15, wherein said pointing device is a spot-light and said another parameter of the pointing device is the actuation of the spot-light to illuminate the respective object.

17. The apparatus according to claim 15, wherein said object of interest includes a specified person within a specified region, said pointing device is a directional microphone or other audio receiver having a variable focal point, and said another parameter of the pointing device is the focal point of the audio receiver.

18. The apparatus according to claim 15, wherein said object of interest includes a specified person within a specified region, said pointing device is a directional speaker or other audio transmitter having a variable focal point, and said other parameter of the pointing device is the focal point of the audio transmitter.

19. The apparatus according to claim 15, wherein there are a plurality of pointing devices selectively controlled by said another signal from said derivative processor.

20. The apparatus according to claim 15, wherein there are a plurality of objects of interest and a plurality of pointing devices each being controlled to track the movements, and said another parameter of selected object of interest according to instantaneous conditions of the respective object.

21. Apparatus for controlling a pointing device according to the movements of an object of interest in a monitored field, comprising:
   a Radio Frequency Identification Device which is attached to the object, which is or includes a ball or puck involved in playing a game, and which when triggered, transmits the identification of the object;

detectors for detecting the transmitted identification at a plurality of different locations sufficient to define the instantaneous space location of the object in the monitored field;

a Real-Time Location Processor coupled to a Derivative Processor for deriving therefrom a tracking signal defining the real-time movements of the object within the monitored field;

and a pointing device controlled by said Real-Time Location Processor to track the movements of said object in a real-time manner;

characterized in that said Real-Time Location Processor derives another signal, in addition to said tracking signal, defining another instantaneous condition of the object, which another signal is also fed to the pointing device to control another parameter of the pointing device in a real-time manner; and wherein said another instantaneous condition of the ball or puck is its vertical acceleration, and said another parameter of the pointing device is the field-of-view of a camera, which is decreased, and thereby the magnification of the ball or puck displayed is increased, when the vertical acceleration of the ball or puck is relatively high.

22. The apparatus according to claim 21, including one or more of said pointing devices which are or include a camera, laser, spotlight, directional microphone and/or directional speaker.

23. The apparatus according to claim 21, wherein said object of interest includes one or more persons involved in playing a game.

24. The apparatus according to claim 21, wherein said another instantaneous condition of the ball or puck includes its distance from a specified reference point or line.

25. The apparatus according to claim 24, wherein said another parameter of the pointing device is the field-of-view of a camera, which is decreased to thereby increase the magnification of the ball or puck displayed by the camera, when the ball or puck is within a specified distance from the specified reference point or line.

26. The apparatus according to claim 24, wherein said other parameter of the pointing device includes highlighting of its display by a camera when the ball or puck is within a specified distance from a specified reference point or line.

27. The apparatus according to claim 21, wherein said another instantaneous condition of the ball or puck includes its horizontal velocity, and said another parameter of the pointing device is the field-of-view of a camera which is decreased, and thereby the magnification of the ball or puck displayed is increased, when the horizontal velocity of the ball or puck is relatively low.

28. The apparatus according to claim 21, wherein said object of interest includes a specified person in the monitored field, and said another parameter of the pointing device includes highlighting of the display of that person by a camera when within a specified distance from a reference point or line.

* * * * *